US008628653B2

(12) United States Patent
Kaku et al.

(10) Patent No.: US 8,628,653 B2
(45) Date of Patent: Jan. 14, 2014

(54) ELECTRODEIONIZATION APPARATUS (75) Inventors: Hirokazu Kaku, Tokyo (JP); Masanobu Osawa, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 847 days.

(21) Appl. No.: 12/309,758

(22) PCT Filed: Jul. 31, 2007

(86) PCT No.: PCT/JP2007/065002
§ 371 (c)(1),
(2), (4) Date: Nov. 12, 2009

(87) PCT Pub. No.: WO2008/016055
PCT Pub. Date: Feb. 7, 2008

(65) Prior Publication Data
US 2010/0096269 A1    Apr. 22, 2010

(30) Foreign Application Priority Data
Aug. 2, 2006   (JP) ................................. 2006-211471

(51) Int. Cl.
*B01D 61/48* (2006.01)
(52) U.S. Cl.
USPC ......................................... 204/632; 204/524
(58) Field of Classification Search
USPC ................................................ 204/632, 524
See application file for complete search history.

(56) References Cited

U.S. PATENT DOCUMENTS

| | | | |
|---|---|---|---|
| 6,284,124 B1 * | 9/2001 | DiMascio et al. | 205/753 |
| 6,296,751 B1 * | 10/2001 | Mir | 204/524 |
| 6,649,037 B2 * | 11/2003 | Liang et al. | 204/632 |
| 2004/0178075 A1 * | 9/2004 | Sato | 204/632 |

FOREIGN PATENT DOCUMENTS

| | | | |
|---|---|---|---|
| JP | 4-72567 | B2 | 11/1992 |
| JP | 2751090 | B2 | 11/1992 |
| JP | 2699256 | B2 | 2/1998 |
| JP | 2001-198577 | A | 7/2001 |
| JP | 2001-340863 | A | 12/2001 |
| JP | 2002-186973 | A | 7/2002 |
| JP | 2003-326270 | A | 11/2003 |
| JP | 2005-52766 | A | 3/2005 |
| JP | 2005-508729 | A | 4/2005 |

OTHER PUBLICATIONS

International Search Report of the International Searching Authority mailed on Sep. 11, 2007 for the corresponding International patent application No. PCT/JP2007/065002 (English version enclosed).

* cited by examiner

*Primary Examiner* — Arun S Phasge
(74) *Attorney, Agent, or Firm* — Posz Law Group, PLC (57) ABSTRACT

An electrodeionization apparatus has a cathode and an anode, and has alternately formed therebetween concentrating chambers and desalination chambers by alternately arranging a plurality of anion exchange membranes and cation exchange membranes, each of the concentrating chambers being provided with a bipolar membrane to partition the interior of the concentrating chamber into a cathode side and an anode side, and each of the desalination chambers being divided into at least two layers including a first layer and a second layer, from an upstream side in a direction of flow of water to be treated, and being filled with an ion exchanger comprising an anion exchanger and a cation exchanger. The ion exchanger filling the first layer contains no less than 50 vol % of the cation exchanger, while the ion exchanger filling the second layer contains over 50 vol % to 80 vol % of the anion exchanger. As a result, the electrodeionization apparatus can be stably operated for a prolonged period of time while preventing formation of scale in the concentrating chambers and desalination chambers.

20 Claims, 4 Drawing Sheets

ELECTRODEIONIZATION APPARATUS

CROSS REFERENCE TO RELATED APPLICATIONS

This application is a U.S. national stage application of PCT/JP2007/065002 filed on Jul. 31, 2007, and claims priority to, and incorporates by reference, Japanese Patent Application No. 2006-211471 filed on Aug. 2, 2006.

TECHNICAL FIELD

The present invention relates to an electrodeionization apparatus, and more particularly to an electrodeionization apparatus that allows preventing scale damage in desalination chambers.

BACKGROUND ART

Figure 4:
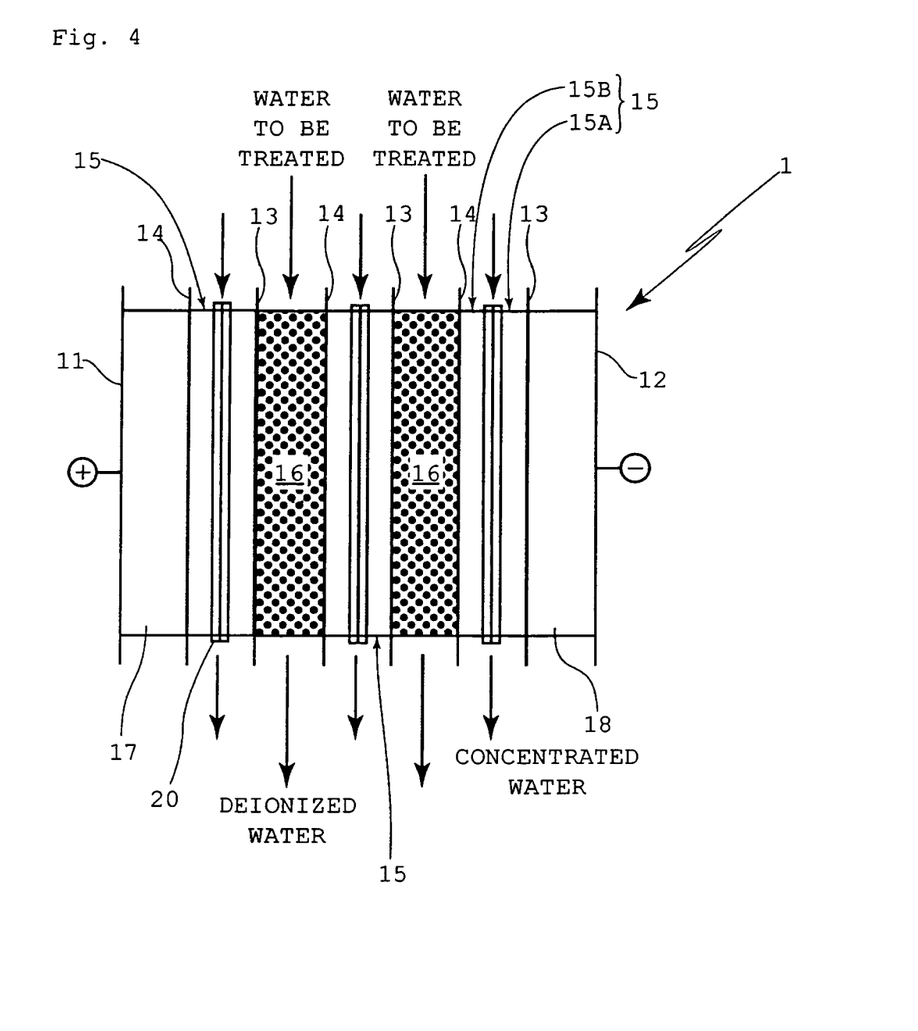
FIG. 4 is a schematic diagram showing a conventional electrodeionization apparatus.

Electrodeionization apparatuses such as the electrodeionization apparatus 1 shown in FIG. 4 are conventionally used for producing deionized water that is used in, for instance, semiconductor manufacturing plants, liquid crystal manufacturing plants, and in various industries such as the pharmaceutical, foodstuff and power industries, as well as in consumer and research facilities (Patent documents 1 to 3). Such an electrodeionization apparatus 1 comprises concentrating chambers 15 and desalination chambers 16 formed alternately by alternately arranging a plurality of anion exchange membranes (A membranes) 13 and cation exchange membranes (C membranes) 14 between electrodes (an anode 11, a cathode 12, an anode chamber 17 and a cathode chamber 18). The desalination chambers 16 are filled with an anion exchanger and a cation exchanger comprising, for instance, an ion exchange resin, ion exchange fibers or a graft exchanger, in a mixed or multilayered state.

Water dissociation in the electrodeionization apparatus gives rise to $H^+$ ions and $OH^-$ ions that regenerate continuously the ion exchangers that fill the desalination chambers, thereby enabling an efficient desalination treatment. Herein there is required no regeneration process using chemicals, as is the case in conventional ion exchangers that have been widely used heretofore. Such electrodeionization apparatuses elicit thus the superior effect of providing high-purity water that can be obtained in a completely continuous manner.

When using directly tap water, obtained by subjecting river water, groundwater or the like to clarification, dechlorination and softening treatments in a water treatment plant, as the water to be treated in electrodeionization apparatuses, or when the water to be treated has a high calcium concentration, (1) scale forms in the concentrating chambers, and (2) the conductivity of the treated water deteriorates on account of increased $CO_2$ load. Therefore, such waters are not processed directly as water to be treated in electrodeionization apparatuses.

Among the above problems, the increased $CO_2$ load (2) can be solved by using a comparatively inexpensive decarbonation apparatus as a pre-treatment apparatus of the electrodeionization apparatus. To prevent formation of scale in the concentrating chambers, as in (1), there are methods that involve removing completely hard components from the water to be treated, by providing a softener or the like before the electrodeionization apparatus. A softener, however, has to be regenerated. This nullifies the advantages of using an electrodeionization apparatus, which does not require regeneration.

To solve the above problem, known methods involve disposing a reverse osmosis membrane device (RO membrane device) as a pre-treatment apparatus of the electrodeionization apparatus, with a view to reducing the concentration of hard components and $CO_2$. An ordinarily employed method resorts to arranging two RO membrane devices in series, in particular when the hard component concentration in the water to be treated is high.

Methods have been proposed (Patent documents 4 and 5) in which the concentrating chambers 15 of a electrodeionization apparatus 10 are partitioned by bipolar membranes 20, as shown in FIG. 4, to prevent thereby calcium ions ($Ca^{2+}$) and carbonate ions ($CO_3^{2-}$) from meeting and giving rise to a scale component in the concentrating chamber 15. This allows omitting the RO membrane device that had been necessary as a pre-treatment apparatus of the electrodeionization apparatus 10. Equipment costs and process costs can be reduced accordingly.

Patent document 1: Japanese Patent No. 1782943
Patent document 2: Japanese Patent No. 2751090
Patent document 3: Japanese Patent No. 2699256
Patent document 4: Japanese Patent Application Laid-open No. 2001-198577
Patent document 5: Japanese Patent Application Laid-open No. 2002-186973

DISCLOSURE OF THE INVENTION

Problem to be Solved by the Invention

When feeding water treated with a single RO membrane into the electrodeionization apparatus in the methods described in Patent documents 4 and 5, however, hydroxide scale may form at locations of large anion exchanger ratio having comparatively high pH in the desalination chambers of the electrodeionization apparatus, when the hard component concentration in the raw water fluctuates or when the hard component concentration is very high. This gives rise to precipitation of insoluble components such as magnesium hydroxide, and makes a stable operation impossible, among other problems.

A high hard component concentration in the raw water makes it necessary to provide two RO membrane devices before the electrodeionization apparatus. This is problematic in terms of, for instance, the associated higher equipment cost and greater power consumption by the high-pressure pumps that drive the RO membrane devices.

There is thus a need for an electrodeionization apparatus that can operate stably with a pre-treatment of just a single RO membrane device, even under conditions of extremely high hard component concentration in the water to be treated.

In the light of the above, it is an object of the present invention to provide an electrodeionization apparatus that can operate stably for long periods of time while preventing scale formation in concentrating chambers and desalination chambers.

Means for Solving the Problem

In order to solve the above problems, the present invention provides an electrodeionization apparatus having a cathode and an anode, and having alternately formed therebetween concentrating chambers and desalination chambers by alternately arranging a plurality of anion exchange membranes and cation exchange membranes, each of the concentrating chambers being provided with a bipolar membrane to partition the interior of the concentrating chamber into a cathode side and an anode side, wherein each of the desalination chambers is divided into at least two layers, including a first layer and a second layer, from an upstream side in a direction of flow of water to be treated, and is filled with an ion exchanger comprising an anion exchanger and a cation exchanger, the ion exchanger filling the first layer comprises no less than 50 vol % of the cation exchanger, and the ion exchanger filling the second layer comprises over 50 vol % to 80 vol % of the anion exchanger (Invention 1).

According to the above invention (Invention 1), the ion exchanger that fills the first layer of the desalination chambers comprises no less than 50 vol % of cation exchanger. This facilitates movement and selective removal of divalent cations such as calcium ions ($Ca^{2+}$) and magnesium ions ($Mg^{2+}$) in the water to be treated. Also, the exchanger filling the second layer comprises over 50 vol % to 80 vol % of the anion exchanger, which facilitates movement and removal of bicarbonate ions ($HCO_3^-$) in the water to be treated and of hydroxide ions ($OH^-$) generated in the desalination chambers through water dissociation. In particular, formation of hydroxide scale can be prevented, without raising the pH of the water to be treated, by filling with a cation-rich ion exchanger the first layer, into which the water to be treated is infused first.

Also, the present invention provides an electrodeionization apparatus having a cathode and an anode, and having alternately formed therebetween concentrating chambers and desalination chambers by alternately arranging a plurality of anion exchange membranes and cation exchange membranes, each of the concentrating chambers being provided with a bipolar membrane to partition the interior of the concentrating chamber into a cathode side and an anode side, wherein each of the desalination chambers is divided into at least three layers, including a first layer, a second layer and a third layer, from an upstream side in a direction of flow of water to be treated, and is filled with an ion exchanger comprising an anion exchanger and a cation exchanger, the ion exchanger filling the first layer and third layer comprises no less than 50 vol % of the cation exchanger, and the ion exchanger filling the second layer comprises over 50 vol % to 80 vol % of the anion exchanger (Invention 2).

According to the above invention (Invention 2), divalent cations such as calcium ions and magnesium ions in the water to be treated move and are selectively removed in the first layer of the desalination chambers, while anions such as bicarbonate ions and hydroxide ions are removed in the second layer of the desalination chambers. As a result, this allows preventing formation of a scale of calcium carbonate, magnesium hydroxide or the like in the desalination chambers, and enables movement and removal of monovalent cations such as sodium ions in the third layer of the desalination chambers. The electrodeionization apparatus can operate stably as a result over long periods of time, while improving the quality of the deionized water obtained in the desalination chambers.

The above inventions (Inventions 1 and 2) allow processing water to be treated in which the total hard component concentration is 0.5 mg/L or higher in terms of calcium carbonate concentration (Invention 3).

Ordinarily, the total hard component content of water to be treated that is supplied to the electrodeionization apparatus is adjusted to less than 0.5 mg/L by providing a single reverse osmosis membrane device, as a pre-treatment apparatus, upstream of the electrodeionization apparatus, to prevent thereby scale formation in the electrodeionization apparatus. A further reverse osmosis membrane device must be provided when the total hard density content of the water to be treated supplied to the electrodeionization apparatus is 0.5 mg/L or higher. According to the above invention (Invention 3), however, water to be treated can be processed without providing a further reverse osmosis membrane device, even when the quality of the water to be treated deteriorates or when the total hard component concentration in the water to be treated is extremely high.

In the above inventions (Inventions 1 to 3), the water to be treated has preferably a pH adjusted to 6.5 or lower (Invention 4). When the pH is high (alkaline pH), insoluble components such as magnesium hydroxide precipitate at portions of high volume ratio of anion exchanger inside the desalination chambers. This may preclude the electrodeionization apparatus from operating stably. In such an invention (Invention 4), however, formation of hydroxide scale such as magnesium hydroxide scale in the electrodeionization apparatus can be effectively prevented by processing water to be treated having a pH adjusted beforehand to 6.5 or lower.

In the above inventions (Inventions 1 to 4), the bipolar membrane is preferably provided in the concentrating chambers in such a manner that an anion exchange layer surface is faced to the anode side and a cation exchange layer surface is faced to the cathode side (Invention 5).

According to the above invention (Invention 5), by facing to the anode side the anion exchange layer surface of the bipolar membrane provided in the concentrating chambers, and facing to the cathode side the cation exchange layer surface of the bipolar membrane, the bipolar membrane blocks calcium ions permeating from the desalination chambers on the side of the cation exchange membrane of the concentrating chambers, and bicarbonate ions permeating from the desalination chambers on the side of the anion exchange membrane of the concentrating chambers, so that the calcium ions and the bicarbonate ions are prevented from coming together. Formation of a scale of calcium carbonate or the like can be prevented as a result.

In the above inventions (Inventions 1 to 5), the concentrating chambers are preferably filled with an ion exchanger (Invention 6). According to the invention (Invention 6), filling the concentrating chambers with an ion exchanger allows ions to move quickly in the concentrating chambers, and allows suppressing voltage rises during operation. Deionized water of stable quality can be obtained as a result. Also, calcium ions and bicarbonate ions that permeate from the desalination chambers into the concentrating chambers can be removed, while scale is effectively prevented from forming in the concentrating chambers.

In the above inventions (Inventions 1 to 6), there is preferably provided a flow channel for feeding part of outflow water from the desalination chambers into an inflow side of the concentrating chambers (Invention 7). According to the invention (Invention 7), causing thus part of the deionized water to flow into the concentrating chambers allows reducing calcium concentration by diluting with deionized water the circulation water in the concentrating chambers, even when treating water having a high calcium concentration, such as tap water. This allows preventing yet more effectively formation of scale in the concentrating chambers.

Advantageous Effect of the Invention

The present invention provides an electrodeionization apparatus that can operate stably for long periods of time while preventing scale formation in concentrating chambers and desalination chambers.

DESCRIPTION OF THE REFERENCE NUMERALS

| | |
|---|---|
| 1 | electrodeionization apparatus |
| 11 | anode |
| 12 | cathode |
| 13 | anion exchange membranes |
| 14 | cation exchange membranes |
| 15 | concentrating chamber |
| 16 | desalination chamber |
| 17 | anode chamber |
| 18 | cathode chamber |
| 20 | bipolar membrane |
| 20A | anion exchange layer surface |
| 20B | cation exchange layer surface |
| 30 | ion exchanger |
| 30A | anion exchange resin |
| 30B | cation exchange resin |

BEST MODE FOR CARRYING OUT THE INVENTION

Figure 1:
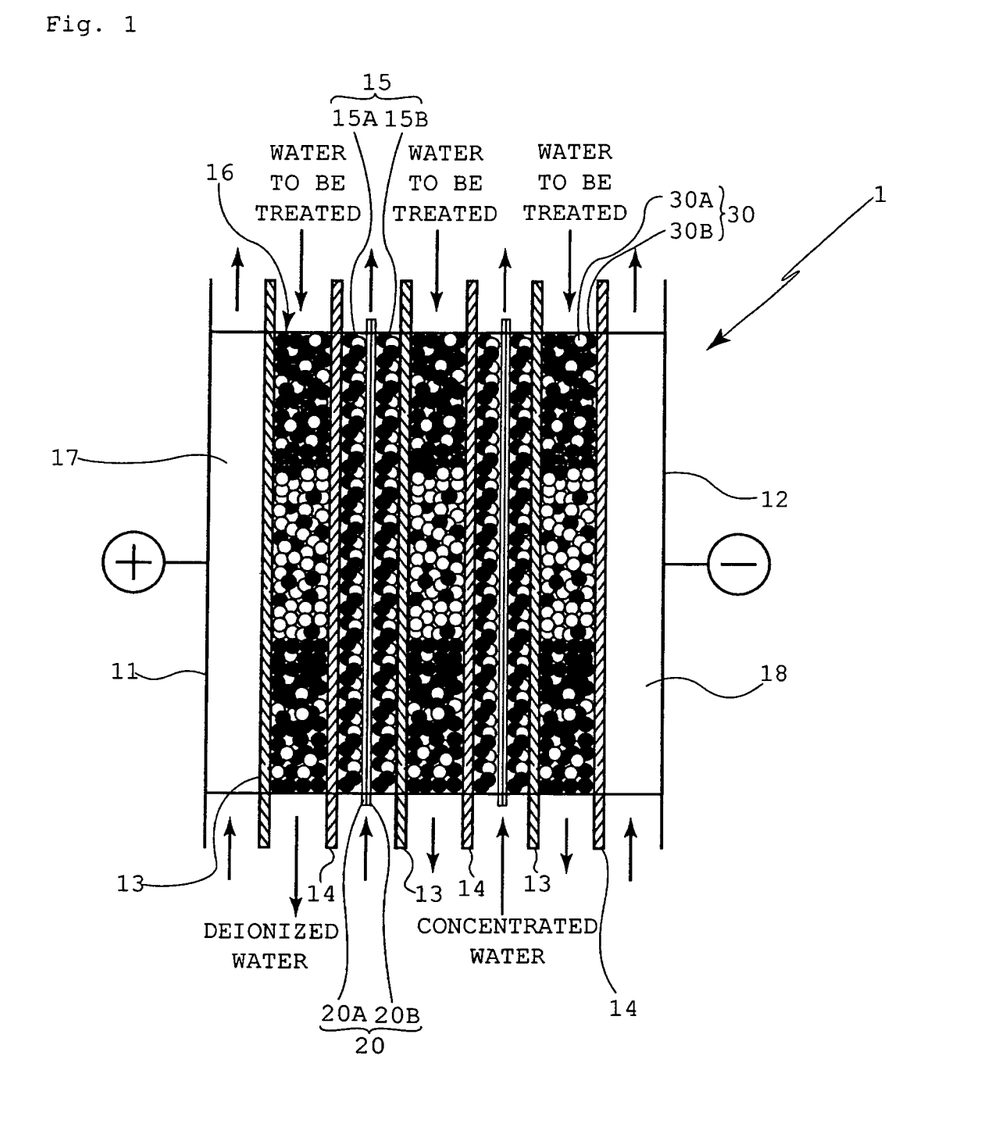
FIG. 1 is a schematic diagram showing an electrodeionization apparatus according to an embodiment of the present invention.
Figure 2:
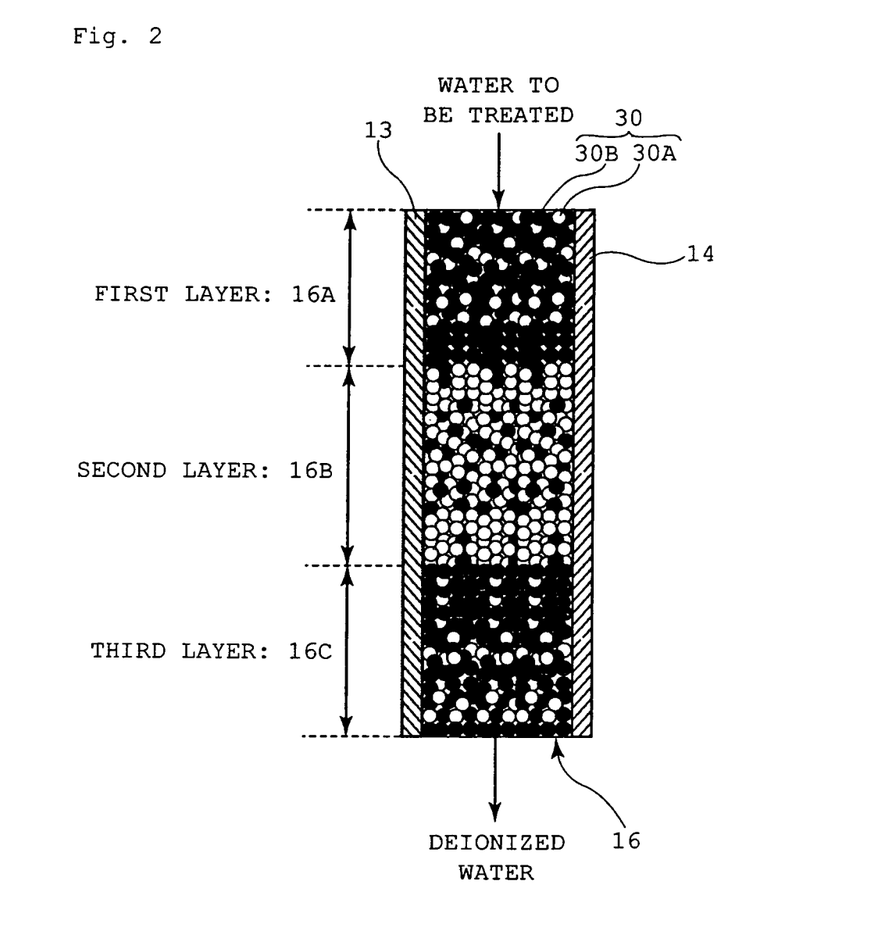
FIG. 2 is an enlarged cross-sectional diagram showing a desalination chamber of the electrodeionization apparatus according to the embodiment.

An electrodeionization apparatus according to an embodiment of the present invention is explained next with reference to accompanying drawings. FIG. 1 is a schematic diagram showing an electrodeionization apparatus according to the present embodiment; and FIG. 2 is an enlarged cross-sectional diagram showing a desalination chamber of the electrodeionization apparatus according to the embodiment.

As shown in FIG. 1, an electrodeionization apparatus 1 according to the present embodiment comprises an anode 11, a cathode 12, an anode chamber 17, a cathode chamber 18, as well as desalination chambers 16 and concentrating chambers 15 formed alternately between the anode 11 and the cathode 12 by alternately arranging cation exchange membranes 14 and anion exchange membranes 13.

Each of the concentrating chambers 15 is fitted with a bipolar membrane 20. Each concentrating chamber 15 is thus partitioned by the bipolar membrane 20 into an anode-side chamber 15A and a cathode-side chamber 15B.

The bipolar membrane 20 is disposed in such a manner that an anion exchange layer surface 20A thereof is faced to the side of the cathode 12 and a cation exchange layer surface 20B is faced to the side of the anode 11. As a result, bicarbonate ions ($HCO_3^-$) permeating from the desalination chamber 16 on the side of the anion exchange membrane 13 and calcium ions ($Ca^{2+}$) permeating from the desalination chamber 16 on the side of the cation exchange membrane 14 are blocked respectively by the cation exchange layer surface 20B and the anion exchange layer surface 20A of the bipolar membrane 20. This allows preventing formation of calcium carbonate scale in the concentrating chambers 15, which occurs when bicarbonate and calcium ions come together.

In the present embodiment, the bipolar membrane 20 provided in the concentrating chambers 15 is not particularly limited, so long as it comprises a anion exchange layer 20A and a cation exchange layer 20B and has high water electrolysis efficiency.

The desalination chambers 16 are filled with an anion exchange resin 30A and a cation exchange resin 30B as an ion exchanger 30. The quality of the deionized water obtained in the desalination chambers 16 can be improved by filling the desalination chambers 16 with the anion exchange resin 30A and the cation exchange resin 30B.

As shown in FIG. 2, each desalination chamber 16 is divided, from the upstream side in the direction of flow of the water to be treated, and is filled with the ion exchanger 30 having dissimilar mixing ratios of the anion exchange resin 30A and the cation exchange resin 30B. In the present embodiment, each desalination chamber 16 is divided into three layers including a first layer 16A, a second layer 16B and a third layer 16C, from the upstream side in the direction of flow of the water to be treated. The embodiment, however, is not limited to such a division, and thus the desalination chamber 16 may be divided, for instance, into two layers including a first layer and a second layer, or into four or more layers.

The mixing ratio of the anion exchange resin 30A and the cation exchange resin 30B in the ion exchanger 30 that fills the first layer 16A and the third layer 16C of the desalination chamber 16 is such that the volume ratio of the cation exchange resin 30B in the ion exchanger 30 is not lower than 50 vol %. The volume ratio of the cation exchange resin 30B in the first layer 16A ranges preferably from 50 vol % to 80 vol %, while the volume ratio of the cation exchange resin 30B in the third layer 16C is preferably not lower than 70 vol %. Hard components (divalent cations such as $Ca^{2+}$ and $Mg^{2+}$) can be selectively and efficiently removed from the water to be treated that is supplied to the desalination chambers 16 by increasing the volume ratio of the cation exchange resin 30B within the mixed resin that makes up the first layer 16A. This allows preventing formation of scale such as calcium carbonate or magnesium hydroxide. Also, increasing the volume ratio of the cation exchange resin 30B in the mixed resin that makes up the third layer 16C allows removing monovalent cations such as sodium ($Na^+$), contained in the water to be treated that is supplied to the desalination chambers 16, and which have failed to be removed in the first layer 16A. This allows further improving the quality of the deionized water that is obtained in the desalination chambers 16.

The volume ratio of the anion exchange resin 30A in the ion exchanger 30 that fills the second layer 16B of the desalination chambers 16 ranges from over 50 vol % to 80 vol %. Preferably, the volume ratio of the anion exchange resin 30A ranges from 65 to 80 vol %. Anions ($OH^-$, $HCO_3^-$, $Cl^-$ and the like) in the water to be treated can be selectively and efficiently removed by increasing the volume ratio of the anion exchange resin 30A in the ion exchanger 30 that fills the second layer 16B of the desalination chambers 16. Increasing the volume ratio of the anion exchange resin 30A in the second layer causes the concentration of $OH^-$ ions to rise through ion exchange, which might result in the formation of a hydroxide scale of magnesium hydroxide or the like, when divalent cations ($Ca^{2+}$, $Mg^{2+}$ and the like) are present. Formation of hydroxide scale, however, can be prevented since divalent cations are selectively removed in the first layer 16A.

The concentrating chamber 15 may be filled with a mixture of the anion exchange resin 30A and the cation exchange resin 30B, or with the anion exchange resin 30A or the cation exchange resin 30B alone. Filling the concentrating chambers 15 with a mixture of the anion exchange resin 30A and the cation exchange resin 30B, or with either of the foregoing alone, causes ions to move quickly within the concentrating chamber 15, and current to flow more readily therein. This allows suppressing voltage rises during operation, and allows obtaining deionized water of stable water quality.

When the concentrating chambers 15 are filled with a mixture of the anion exchange resin 30A and the cation exchange resin 30B, the mixing ratio of the foregoing is not particularly limited, although for instance, the mixing ratio is preferably anion exchange resin 30A:cation exchange resin 30B=90:10 to 10:90, more preferably anion exchange resin 30A:cation exchange resin 30B=70:30 to 30:70.

Figure 3:
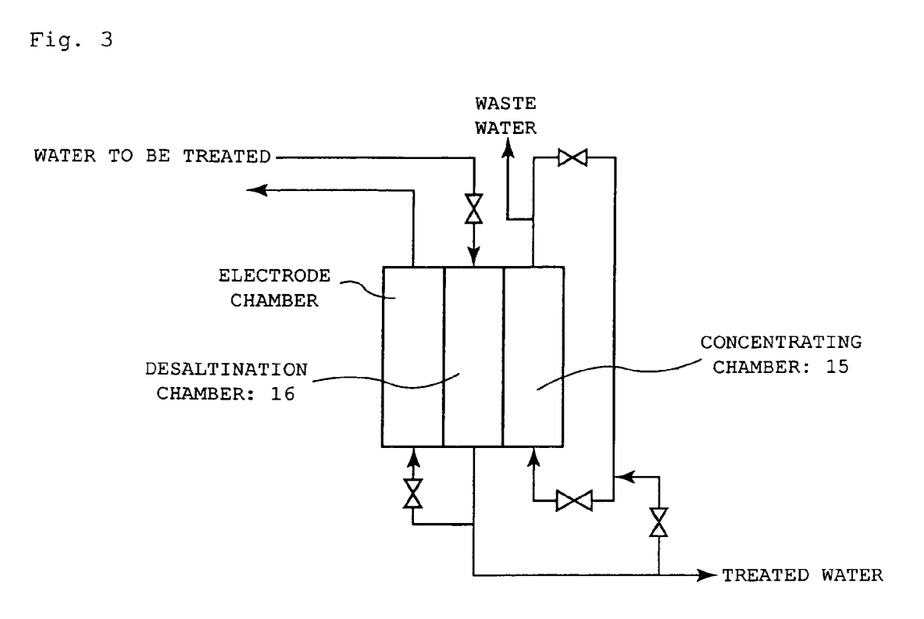
FIG. 3 is a flow diagram showing the flow of water to be treated in the electrodeionization apparatus according to the embodiment.

As shown in FIG. 3, the electrodeionization apparatus 1 according to the present embodiment comprises deionized water supply piping that connects the outflow side of the desalination chambers 16 with the inflow side of the concentrating chambers 15 and the electrode chambers (anode chamber 17 and cathode chamber 18). Through the deionized water supply piping, part of the deionized water flowing out of the desalination chambers 16 is supplied to the concentrating chambers 15 and to the electrode chambers (anode chamber 17 and cathode chamber 18). Causing thus part of the deionized water to flow into the concentrating chambers 15 allows reducing calcium concentration by diluting with deionized water the circulation water in the concentrating chambers 15, even when treating water having a high calcium concentration, such as tap water. This allows preventing yet more effectively formation of scale in the concentrating chambers 15.

The water to be treated that is fed to the desalination chambers 16 of the electrodeionization apparatus 1 according to the present embodiment as explained above has preferably the pH thereof adjusted beforehand. Specifically, the water to be treated that is supplied is preferably adjusted beforehand to a pH not higher than 6.5, in particular to a pH not higher than 5.8. When the pH of the water to be treated exceeds 6.5, there may form an insoluble hydroxide scale of magnesium hydroxide or the like in the desalination chambers 16. This scale may lead to a rise in the differential pressure of the desalination chambers 16, which in turn may end up obstructing the desalination chambers 16.

The method for adjusting the pH of the water to be treated is not particularly limited, so long as it is an ordinary pH adjustment method. For instance, the pH of the water to be treated may be adjusted through addition of a pH adjuster. When a decarbonation apparatus is provided as a pre-treatment, the pH of the water to be treated may be adjusted by adjusting the amount of decarbonation in the decarbonation apparatus.

In the electrodeionization apparatus 1 according to the present embodiment as explained above, water to be treated can be processed by being fed to the desalination chambers 16 even when the total hard component concentration is 0.5 mg/L or higher, in terms of calcium carbonate concentration. Also, no scale forms in the desalination chambers 16 and the concentrating chambers 15 even when processing such a water to be treated. As a result, this allows reducing apparatus costs, since there is no need to provide a double RO membrane device as a pre-treatment apparatus of the electrodeionization apparatus 1, even when processing poor-quality water to be treated.

The above embodiment has been described for facilitating understanding of the present invention, and not for limiting the present invention. The various elements described in the above embodiment are thus deemed to also include all design modifications and equivalents falling under the technical scope of the present invention.

EXAMPLES

The present invention is explained in more detail next based on examples and comparative examples, although the invention is in no way meant to be limited to or by them.

The test apparatus used in the comparative examples and examples comprises an activated carbon apparatus and an electrodeionization apparatus arranged in series in this order.

Activated carbon apparatus: "Kuricoal KW10-30", by Kurita Water Industries Ltd.

Electrodeionization apparatus: "Kuritenon SH", by Kurita Water Industries Ltd.

Water treatment amount: 420 L/hr

The water to be treated (tap water) below was prepared for the tests.

Water to be treated: Feed water Ca concentration 28 ppm ($CaCO_3$ basis)

Feed water $CO_2$ concentration 29 ppm ($CaCO_3$ basis)

Comparative Example 1

The above water to be treated was processed to a single-stage RO membrane to yield the water to be treated in the electrodeionization apparatus, the water being treated under the conditions given in Table 1, using the below ion exchange membranes of the electrodeionization apparatus and the below ion exchange resins that filled the desalination chambers and the concentrating chambers of the electrodeionization apparatus. There was measured the conductivity of the obtained treated water as well as the change over time of differential pressure in the desalination chambers and the concentrating chambers for a water flow rate of 10 L/hr in the concentrating chambers.

The results are given in Table 1.

Water to be treated was used as makeup water of the concentrating chamber circulation water and as electrode chamber water.

Anion exchange membrane: "Aciplex A501SB", by Asahi Kasei Corp.

Cation exchange membrane: "Aciplex K501SB", by Asahi Kasei Corp.

Ion exchange resin: anion exchange resin ("SA10A", by Mitsubishi Chemical Co., Ltd.) and cation exchange resin ("SK1B", by Mitsubishi Chemical Co., Ltd.) mixed to a volume mixing ratio of 6:4.

Comparative Example 2

A test was conducted in the same way by processing water under the conditions given in Table 1, but providing now a bipolar membrane in the concentrating chambers of the electrodeionization apparatus used in Comparative example 1, assembling the electrodeionization apparatus shown in FIG. 1, and by feeding part (15%) of the deionized water obtained in the desalination chamber, instead of water to be treated, as the makeup water of the concentrating chamber circulation water and as the electrode chamber water.

The results are given in Table 1.

The bipolar membrane provided in the concentrating chamber was produced as follows.

One surface of a cation exchange membrane having sulfonic acid groups as ion exchange groups (trade name: Neosepta CM-1, by Tokuyama Soda Co., Ltd.) was roughened beforehand with sandpaper, and was then dipped for 1 hour at 25° C. in a 2 wt % aqueous solution of ferrous chloride (FeCl$_2$), followed by thorough washing with ion-exchanged water and air-drying at room temperature.

A 15 wt % aminated polysulfone solution was then prepared by chloromethylating a polysulfone, and dissolving then the aminated polysulfone, made into a quaternary base with trimethylamine (quaternary base exchange capacity: 0.92 meq/g), in a mixed solvent of methanol-chloroform (volume ratio=1:1).

The aminated polysulfone solution was then coated onto the roughened surface of the cation exchange membrane having been treated as described above, followed by drying, to produce a bipolar membrane in which the thickness of the aminated polysulfone was 90 μm.

Example 1

A test was conducted in the same way by processing water under the conditions given in Table 1, but dividing now the desalination chambers of the electrodeionization apparatus used in Comparative example 2 into three layers, and filling therein a mixed resin of an anion exchange resin and a cation exchange resin, to a volume ratio of the anion exchange resin of 30 vol % in the first layer and the third layer, and to a volume ratio of the anion exchange resin of 70 vol % in the second layer, as seen from the upstream side of the direction of flow of the water to be treated in the desalination chambers.

The results are given in Table 1.

TABLE 1

|  |  | Ex. 1 | Comp. Ex. 1 | Comp. Ex. 2 |
|---|---|---|---|---|
| Applied voltage (V) |  | 22.0 | 15.0 | 23.0 |
| Current (A) |  | 2.2 | 2.2 | 2.2 |
| Water recovery rate (%) |  | 85.0 | 85.0 | 85.0 |
| Inlet conductivity (mS/m) |  | 1.7 | 1.7 | 1.7 |
| Outlet cunductivity (mS/m) |  | 0.057 | 0.063 | 0.058 |
| Desalination chamber flow rate - Initial (L/hr) |  | 10.0 | 10.0 | 10.0 |
| Desalination chamber differential pressure (MPa) | Initial | 0.06 | 0.06 | 0.06 |
|  | After 1 week | 0.06 | 0.06* | 0.06 |
|  | After 1 month | 0.05 | — | 0.08 |
|  | After 2 months | 0.06 | — | 0.10 |
|  | After 3 months | 0.06 | — | 0.14** |
| Concentrating chamber flow rate - Initial (L/hr) |  | 10.0 | 10.0 | 10.0 |
| Concentrating chamber differential pressure (MPa) | Initial | 0.06 | 0.06 | 0.06 |
|  | After 1 week | 0.06 | 0.27* | 0.06 |
|  | After 1 month | 0.05 | — | 0.05 |
|  | After 2 months | 0.06 | — | 0.06 |
|  | After 3 months | 0.06 | — | 0.06 |

*After one week, the concentrating chamber differential pressure surpassed the desalination chamber differential pressure, and the electrodeionization apparatus became inoperative.
**Desalination chamber differential pressure rose gradually. Although the apparatus did not become blocked, it was judged that operation could not continue, and the apparatus was stopped.

As shown in Table 1, after one week the concentrating chamber differential pressure surpassed the desalination chamber differential pressure in the electrodeionization apparatus of Comparative example 1, which became inoperative. In the electrodeionization apparatus of Comparative example 2, the differential pressure in the desalination chamber rose after three months. Although the electrodeionization apparatus did not become blocked, ongoing operation thereof was rendered impossible. By contrast, the concentrating chamber differential pressure and the desalination chamber differential pressure did not rise in the electrodeionization apparatus of Example 1, which exhibited stable operation over three months. This showed that the electrodeionization apparatus of Example 1 allows preventing the formation of calcium carbonate scale in the concentrating chambers, and allows preventing formation of magnesium hydroxide scale in the desalination chambers.

The invention claimed is:

1. An electrodeionization apparatus having a cathode and an anode, and having alternately formed therebetween concentrating chambers and desalination chambers by alternately arranging a plurality of anion exchange membranes and cation exchange membranes, each of said concentrating chambers being provided with a bipolar membrane to partition an interior of the concentrating chamber into a cathode side and an anode side,
   wherein each of said desalination chambers is divided into at least three layers, including a first layer, a second layer and a third layer, from an upstream side in a direction of flow of water to be treated, and each of the at least three layers is filled with an ion exchanger mixture comprising an anion exchanger and a cation exchanger,
   the ion exchanger mixture filling said first layer and third layer comprises no less than 50 vol % of said cation exchanger, and
   the ion exchanger mixture filling said second layer comprises from over 50 vol % to 80 vol % of said anion exchanger.

2. The electrodeionization apparatus according to claim 1, further comprising an inlet for introducing water to be processed having a total hard component concentration of 0.5 mg/L or higher in terms of calcium carbonate concentration.

3. The electrodeionization apparatus according to claim 1, further comprising an inlet for introducing water to be processed having a pH of 6.5 or less into the desalination chambers.

4. The electrodeionization apparatus according to claim 1, wherein said bipolar membrane is provided in said concentrating chambers in such a manner that an anion exchange layer surface faces the anode side and a cation exchange layer surface faces the cathode side.

5. The electrodeionization apparatus according to claim 1, wherein said concentrating chambers are filled with an ion exchanger.

6. The electrodeionization apparatus according to claim 1, comprising a flow channel for feeding part of outflow water from said desalination chambers into an inflow side of said concentrating chambers.

7. The electrodeionization apparatus according to claim 1, wherein said ion exchanger mixture filling of said second layer comprises from 65 vol % to 80 vol % of said anion exchanger.

8. The electrodeionization apparatus according to claim 1, wherein said concentrating chambers are filled with said ion exchange mixture in a ratio of cation exchanger to anion exchanger of 90:10 to 10:90.

9. The electrodeionization apparatus according to claim 1, wherein said concentrating chambers are filled with said ion exchange mixture in a ratio of cation exchanger to anion exchanger of 70:30 to 30:70.

10. An electrodeionization apparatus adapted to treat water having a pH higher than 6.5 and adapted to inhibit scale formation, comprising:
   a cathode and an anode;
   alternating concentrating chambers and desalination chambers arranged between the cathode and the anode by alternately arranging a plurality of anion exchange membranes and cation exchange membranes between the cathode and the anode;

each of the concentrating chambers having a bipolar membrane partitioning the concentrating chamber into a cathode side and an anode side;

each of the desalination chambers having at least two mixed ion exchanger layers, the mixed ion exchanger layers comprising:
  a volume mixture of anion exchange resin and cation exchange resin,
  a cation-rich ion exchanger layer having no less than 50 vol % of the cation exchange resin,
  an anion-rich ion exchanger layer having from over 50 vol % to 80 vol % of the anion exchange resin, and
  the cation-rich ion exchanger arranged upstream of the anion-rich ion exchanger in a direction of flow of water to be treated.

11. The electrodeionization apparatus according to claim 10, wherein the anion-rich ion exchanger layer has from 65 vol % to 80 vol % of the anion exchange resin.

12. The electrodeionization apparatus according to claim 10, comprising another cation-rich ion exchanger layer having no less than 50 vol % of the cation exchange resin and arranged downstream of the anion-rich ion exchanger in the direction of flow of water to be treated.

13. The electrodeionization apparatus according to claim 12, wherein the another cation-rich ion exchanger layer has from 65 vol % to 80 vol % of the anion exchange resin.

14. The electrodeionization apparatus according to claim 10, wherein the concentrating chambers are filled with the ion exchange mixture in a ratio of cation exchanger to anion exchanger of 90:10 to 10:90.

15. The electrodeionization apparatus according to claim 10, wherein the concentrating chambers are filled with the ion exchange mixture in a ratio of cation exchanger to anion exchanger of 70:30 to 30:70.

16. An electrodeionization apparatus, which comprises
  a cathode and an anode; and
  concentrating chambers and desalination chambers alternately arranged between the cathode and the anode, each of the concentrating chambers having a bipolar membrane partitioning an interior of the concentrating chamber into a cathode side and an anode side, wherein
  each of said desalination chambers is configured to prevent scale formation within said desalination chambers by including at least three layers each containing a mixture of anion exchange resin and cation exchange resin, and the three layers are arranged from an upstream side to a downstream side in a direction of water flow as follows:
    a first layer configured to selectively remove divalent cations, the ion exchange resin mixture filling said first layer comprising at least 50 vol % of said cation exchange resin,
    a second layer configured to remove anions, the ion exchanger mixture filling said second layer comprising from over 50 vol % to 80 vol % of said anion exchange resin, and
    a third layer configured to remove monovalent cations, the ion exchange resin mixture filling said third layer comprising at least 50 vol % of said cation exchange resin.

17. The electrodeionization apparatus according to claim 16, wherein each of said desalination chambers is further configured to prevent said scale formation within said desalination chambers while processing at least one of water having a total hard component concentration in of 0.5 mg/L or higher in terms of calcium carbonate concentration and water having a pH of 6.5 or less.

18. The electrodeionization apparatus according to claim 16, wherein
  said bipolar membrane is provided in said concentrating chambers in such a manner that an anion exchange layer surface faces the anode side and a cation exchange layer surface faces the cathode side, and said concentrating chambers are filled with an ion exchanger.

19. The electrodeionization apparatus according to claim 16 comprising a flow channel for feeding part of outflow water from said desalination chambers into an inflow side of said concentrating chambers.

20. The electrodeionization apparatus according to claim 16, wherein said ion exchanger mixture filling of said second layer comprises from 65 vol % to 80 vol % of said anion exchange resin.

* * * * *